United States Patent
Handwerker et al.

[11] Patent Number: 5,466,373
[45] Date of Patent: Nov. 14, 1995

[54] MAINTENANCE-FREE ENHANCEMENT OF AQUATIC BIOLOGICAL FILTERS USING AMPHIPODS

[75] Inventors: Thomas S. Handwerker, Salisbury; Clement L. Counts, III, Berlin, both of Md.

[73] Assignee: University of Maryland Eastern Shore, Princess Anne, Md.

[21] Appl. No.: 231,088

[22] Filed: Apr. 22, 1994

[51] Int. Cl.⁶ .................................................. C02F 3/32
[52] U.S. Cl. .................... 210/602; 210/617; 210/619; 210/150
[58] Field of Search .................... 210/602, 610, 210/611, 631, 615–618, 747, 150, 151, 170

[56] References Cited

U.S. PATENT DOCUMENTS

| | | | |
|---|---|---|---|
| 3,957,634 | 6/1976 | Orensrten et al. ................ | 210/169 X |
| 4,086,161 | 4/1978 | Burton ................................ | 210/602 |
| 4,169,050 | 9/1979 | Serfling et al. .................... | 210/602 |
| 4,995,980 | 2/1991 | Jaubert .............................. | 210/602 |
| 5,194,147 | 3/1993 | Augustine et al. ................ | 210/151 |

OTHER PUBLICATIONS

2nd Annual Workshop: "Commercial Aquaculture Using Water Recirculating Systems," La Don Swann Editor, Illinois State Univ. Nov. 15–16, 1991 pp. 14–20.

*Primary Examiner*—Thomas Wyse
*Attorney, Agent, or Firm*—Christopher N. Sears

[57] ABSTRACT

The invention is a method and intended apparatus for filtering water in aquaria, fish-rearing tanks, hatchery or other aquatic systems using amphipods, e.g. the *Hyalella azteca*, in the filtering matrix of the managed water system. In particular, the use of amphipods in the filtration system results in maintenance-free operation due to the action and self-sustaining nature of amphipods in these aquatic systems.

17 Claims, 3 Drawing Sheets

MAINTENANCE-FREE ENHANCEMENT OF AQUATIC BIOLOGICAL FILTERS USING AMPHIPODS

STATEMENT OF GOVERNMENT INTEREST

The invention described herein may be manufactured and used by or for the Government of the United States of America for governmental purposes without the payment of any royalties thereon pursuant to a grant by the Cooperative State Research Service, U.S. Department of Agriculture through contract 90-38814-5545.

FIELD OF THE INVENTION

This invention pertains to an aquatic purification process and intended apparatus using animals in an aquatic purification process.

BACKGROUND OF THE INVENTION

Currently, a submerged biological filtering matrix for a closed, circulated water filtering system must be physically cleaned by backflushing, scrubbing, drainage, or even periodic replacement. The build-up of biological material, the inclusion of suspended solids, and capture of uneaten feed characteristically clogs submerged filtering matrix materials. The need to continually clean these submerged matrices paradoxically requires one to select materials with large pore sizes and less surface area per unit volume.

The use of submerged biological filtration systems for the bioremediation of waste products or improvement in water quality has been discouraged by the subsequent clogging and inactivation of the surfaces as biofloc and other solids accumulate. As the pore space decreases, channelization occurs within the filtering matrix generating additional anaerobic areas that decrease the efficiency of the biological filter. Removal of these materials has proven to be expensive and technologically challenging.

Current recommendations on bioremediation systems use more energy-intensive technologies such as rotating biological contactors or trickle towers to maintain aerobic, fixed-film surfaces for waste bioremediation. The invention herein provides a means for minimizing maintenance and potential clogging of a submerged filtering matrix that saves time and energy. Additionally, the invention herein increases the bioremediation efficiency of existing technologies.

Prior U.S. patents that use small animals in aquatic purification processes include U.S. Pat. No. 4,086,161 of Burton entitled "Ecological System & Method" and U.S. Pat. No. 4,995,980 by Jaubert entitled "System for Biological Purification of Water Containing Organic Materials & Derivative Products." Both of these references use small animals as part of the water purification process in either wetlands of an open aquatic system or in aquaria of a closed aquatic system. In particular Burton '161 calls for use of a crustacean, e.g. Daphnia, an aerobic scavenger that can purify wetland waters on bark floats. In closed recirculated water systems, Jaubert '980 teaches of a natural filtering system for aquaria that use small burrowing detritus eating animals that are incorporated with a porous filtering medium. Neither of these references teach or suggest the use of amphipods in water purification methods with attendant apparatus that ensures self-sustaining maintenance free operation of their respective aquatic systems.

Other prior U.S. patents that use amphipods for bioassay environmental applications includes U.S. Pat. No. 5,194,147 by Augustine et al. entitled "Decontamination System" and U.S. Pat. No. 5,194,634 by Bradley entitled "Bioassay for Environmental Quality". Neither of these patents teach or suggest using amphipods for water purification applications.

SUMMARY OF THE INVENTION

The present invention provides a filtering process with intended apparatus which can easily be adapted to accommodate various system designs and filtering elements, for varying numbers of cultured organisms using amphipods colonies which are self-sustaining. Intended applications are home aquaria, fish hatcheries, and commercial fish production facilities in tanks, raceways and ponds. This filtering process can be used under a wide range of water chemistry physicochemical parameters including both fresh and saline production (brackish) systems which allows for both commercial and amateur aquaculture, home aquarium systems and water gardens.

This process can be initiated to produce a self-sustaining colony of live amphipods in all stages (sizes) of development. It quickly establishes an optimum population density without monitoring or management. Any filtering matrix habitat can be inoculated and transported as a live colony under semi-moist conditions for use in systems distant from the site of inoculation. The introduction of amphipods for maintenance of biofloc and settled solids eliminates the necessary engineering requirements for structural components that must be built to be separately drained and refilled.

The grazing activity of the amphipods stimulates and maintains the biological activity of a biological filter by continually cleaning the pore spaces and surface area. Using this process, with the appropriate sized filtering matrix, the free-ranging activity of the amphipods during foraging, migration, and other natural grazing activities cleans and dislodges this bioflocculant. The small size of the amphipods allows one to select unique filtering matrix materials with high surface area per unit volume. This increase in efficiency allows the user of this filtering process results in a smaller biological filtration systems.

Bioturbation of settled solids by the amphipods in unwanted areas of a production/treatment system encourages resuspension and further bioremediation of these gross solids. Resuspension also eliminates the requirement for expensive slope-bottomed tanks or complex settling cones often recommended for removal of settled solids in large culture/treatment components. Use of the amphipod colony reduces the frequency of cleaning common to existing water purification systems using submerged biofilters and therefore provides a maintenance-free process for selected production systems.

OBJECTS OF THE INVENTION

Accordingly, several objects and advantages of the present invention are:

(a) To provide a process for intended purification apparatus that can easily be sized to accommodate tanks of varying dimensions or which contain varying numbers of fish where a wide range of water chemistry whose physicochemical parameters include both fresh and saline systems. This process will increase the bioremediation efficiency of the intended purification apparatus.

(b) To provide a filtering process for intended apparatus where an amphipod colony process can be used in both commercial and amateur aquaculture, home aquarium systems and water gardens.

(c) To provide a filtering process for intended apparatus that can be initiated to produce a self-sustaining colony of live amphipods in all stages (sizes) of development.

(d) To provide a filtering process for intended apparatus using a filtering matrix habitat which can be inoculated and transported with a live amphipod colony under semi-moist conditions for use in systems distant from the site of inoculation.

Still further advantages will become apparent from a consideration of the ensuing detailed description and drawings.

DETAILED DESCRIPTION

Figure 1A:
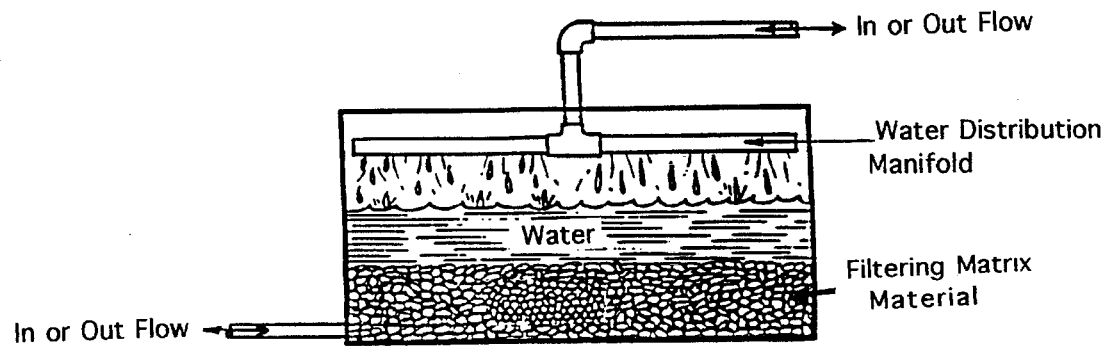
FIG. 1a shows a submerged upflow or downflow mechanical biofilter design used in aquaculture applications which incorporates an amphipod colony.

In a traditional recirculating aquatic system, a waste stream generated by the aquatic animals (i.e., fish, frogs, alligators, etc.) is pretreated by a solids removal technology that eliminates large particles of feces and uneaten feed from the system. This stream is then directed through a biological filter where colloidal materials and dissolved solid are treated by bacteria and other microorganisms associated with the fixed-film surface and water column. The remediated water is re-oxygenated and returned to the culture tanks. Existing culture systems and waste treatment facilities must continually maintain and clean all components in the system to prevent the buildup of thick bacterial floc or sediments that may turn anaerobic and inhibit bioremediation and affect the health of aquaculture species. These sediments can occur at the bottom of the culture tank or accumulate on the filtration surfaces (i.e., reticulated foam, vertical plates, tubesettlers, or other fixed-film materials) of the biofilter proper.

The invention's filtering process uses the introduction of amphipods (e.g., *Hyalella azteca:* Amphipoda) into biological filters and the layer of settled particulates at the bottom of fish rearing tanks, aquaria, hatchery, or other aquatic systems. The aquatic systems already meet conditions that encourage the growth and development of the amphipods without sacrificing production of the cultured species. The natural benthic habitat and activities of the amphipods in an isolated, aerated, submerged biological filter, or in aquatic system sediments, results in their grazing the accumulated biofloc on these surfaces. This prevents the development of anaerobic layers or sediments and promotes additional biological remediation.

In this process, a completely submerged biological filter complex can be inoculated with amphipods which will reduce the subsequent need for cleaning or maintenance. Ideally, this self-sustaining colony is located downstream of a gross solids removal system. The biological filter for treatment of colloidal materials and dissolved wastes is inoculated and the establishment of an amphipod colony, whose members can effectively navigate, will graze the fixed-film surfaces removing accumulated sediments and biofloc. This encourages additional bacterial colonization that provides bioremediation of the dissolved wastes within the water column. The physical action of these amphipods removes the built-up sediment and microbial biofloc which, in turn, clogs uninoculated submerged filters. Like earthworms in soil, these benthic organisms can also maintain sediment oxygenation through the process of bioturbation.

Amphipods which migrate downstream of this biological filter continue to forage additional surfaces within the aquatic system and may provide additional nutritional sustenance to other cultured organisms. Protected from predation within the biofilter, the amphipod colony is self-sustaining and provides for the release of additional members into the water column. Although they may forage and subsequently clean the sediments and biofloc within the aquatic system, in this unprotected environment they are ultimately removed through physical discharge (solids removal stage or mechanical comminution) or by high predation pressure exerted by the cultured species being husbanded. Thus, the amphipods must be maintained in the system at the biofiltration stage (which acts as a refugia), not in the culture tank or solids removal stages of water circulation.

The utilization of these amphipods requires the simple maintenance of appropriate dissolved oxygen throughout the submerged filter and selection of appropriate filtering matrix pore conformation. Oxygenation of the inflow can be accomplished by standard oxygenation technologies or modification of the water flow rate to maintain a maximum drop of less than 1 part per million dissolved oxygen between inflow and outflow. Oxygen levels within the submerged biofilter must be maintained above approximately 2 parts per million dissolved oxygen throughout the filtering matrix.

This stage of the biofiltration must provide adequate protection of the amphipods from predatory species including insects, amphibians, and fish. Thus, the biofiltration component should be either isolated from the culture tank or be constructed of materials that provide refugia for the amphipods in the presence of the cultured species so that the colony is self-sustaining. The influx of nutrient-rich water from the culture tank provides the necessary substratum to support microbial growth on the fixed-film surface of the filter matrix. A complex of heterotrophic and autotrophic bacteria consumes dissolved waste products generated by the aquatic organisms in the tank, converting particularly the ammonia, nitrogenous, and carbonaceous wastes, into microbial biomass that takes the form of biofloc. In turn, the accumulated biofloc is consumed by the amphipods. The structure of the filtering matrix must be of a pore space (4–12 mm minimum) so to allow the amphipods to navigate within the interstices of the refugia, harvesting this biofloc for their growth and development.

This design of this process requires only the nutrient-rich influx of water that is generated by the aquatic animals being cultured in the tank or aquarium system. Water quality parameters suitable for the culture of fish fry and fingerlings have been demonstrated to provide adequate nutritional requirements necessary for the growth and reproduction of amphipods. Therefore, no special adjustments of the aquatic environment is needed to sustain both fish and amphipods using this filtration complex process.

The ability of the amphipods to forage the solid surface of the submerged filtering matrix is limited only by their ability to navigate through the interstices. A significant portion of the intersticies must be constructed to allow for the largest adults (4–6 mm) to migrate. Preferably in a 4–12 mm porous size range.

A population of amphipods can be inoculated into a new filtering matrix by simply inserting a colonized filter from a tank system that currently sustains a population of amphipods. Natural movement of amphipods into the water column by physical ejection or their foraging for food away from the original filter complex will result in colonization of the new complex.

BEST MODE

Amphipods are selected as the organism of choice for filtration systems because of their biology and ecology. They are known to inhabit burrows in the superficial layers of soft substrata. In aquatic plants, they are reported to browse on films composed of microscopic plants, animals, or other organic debris that cover the leaves and stems. Their food is composed of plant and animal matter and they are known to be voracious omnivores and general scavengers. Only rarely do they attack and feed on living animals (the usual feeding mode being to scavenge dead bodies).

Reproduction as a rule is syngamic. The animals breed in naturally occurring populations between February and October, depending upon water temperature. From our observations, these amphipods breed all year in aquaculture recirculating systems. Fertilized eggs are released into a marsupium of the female in number of approximately 18 eggs/brood. Newly hatched young are then retained in this marsupium for a period of 1 to 8 days, see Pennak, R. W. 1986. Fresh-Water Invertebrates of the United States, 3rd Ed. John Wiley and Sons pp. 474–488. Studies indicate that the most common species, *Hyallela azteca*, averages 15 broods in 152 days, thereby having a reproductive potential of 270 young/female/152 days.

A common species of amphipod (*Hyallela azteca*) is a cold stenothermic amphipod. They can however live and reproduce successfully at warm water temperatures of between 74°–84° F. that is necessary for the culture of aquatic species. They are also reported to be negatively phototaxic and thus avoid light by hiding in the stems or roots of aquatic vegetation or under such debris as stones or organic matter. In culture jars, they congregate in corners. Thus, they will readily inhabit the biofilter matrix as a means of escaping predators. While most species are reported to be shallow water inhabitants, one species, *Hyallela azteca*, occurs naturally at depths greater than three feet. Therefore, the amphipods will easily survive placement in filtering matrix located at depths found in standard aquaculture tanks. Further, the amphipods have been reported from alkaline and brackish waters. Amphipods in our studies have been found to reproduce and live in the waters of aquaculture tanks that have a pH range from 6.9 to 8.3 and they have successfully reproduced in waters with a salinity range of 0 to 19 parts per thousand. Variations in the salinity and/or temperature regime of the aquaculture system can be adjusted for by the selection of an amphipod species of appropriate size that will tolerate the selected salinity and temperature range.

Amphipods have demonstrated self-sustaining populations in a range of filtering matrix materials from aquatic roots, reticulated foam, and rigid-surface, and submerged filtering matrix materials. These aquaculture systems have operated for over 36 months without mass mortality of the amphipods. These amphipods have also been self-sustaining in ozonated aquaculture water reuse demonstration systems.

Figure 1B:
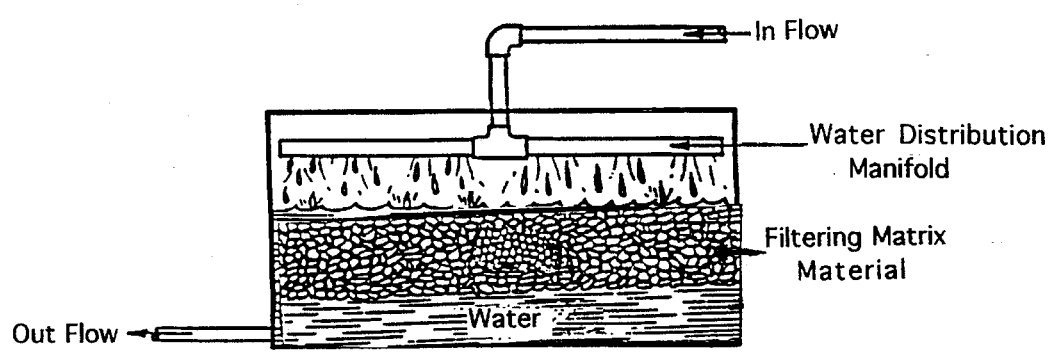
FIG. 1b shows a trickling tower mechanical biofilter design used in aquaculture applications which incorporates an amphipod colony.
Figure 2:
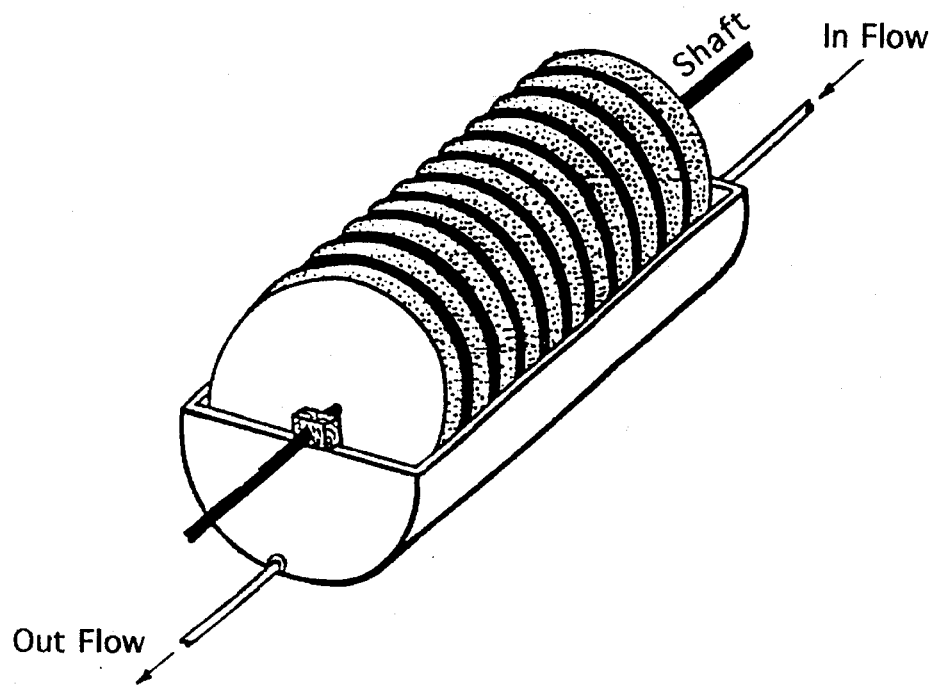
FIG. 2 shows a biodisk mechanical biofilter design used in aquaculture applications which incorporates an amphipod colony.

The increased efficiency of the submerged biological filter observed in our research trials may be related to the physical grazing activity to the amphipods. In the absence of amphipods, bacteria begin to accumulate on the physical surfaces of the filtering matrix. As the layer becomes thicker, the lower layers become limited in available nutrients and oxygen. This environment stimulated the development of anaerobic bacteria which operate and produce toxic wastes and compete for additional surface. There are also a competition between heterotrophic bacteria (consuming dissolved carbohydrates) and the autotrophic bacteria which are slower growing but consume the nitrogenous wastes that are toxic to fish. Mechanical filtering apparatus used with the invention are a submerged down flow biofilter as shown in FIG. 1a, a trickle tower biofilter which is a variation of either an upflow or a down flow biofilter except that the filtering matrix material is kept damp and not submerged as shown in FIG. 1b, and a rotating biodisk contactor system as shown in FIG. 2 are all designed so that a physical shearing action continuously removes this build-up of thick biological layers. The use of submerged filter of FIG. 1a eliminates the energy requirements necessary to pump water to the top of a trickle tower in a downflow version or physically rotate the contactor. The filtering matrix element in the submerged filter biofilter can be a multiple parallel, porous fiberglass plate assembly where the plates are approximately 1–2 inches apart. Another version includes the use of tube settlers which is a sheet of labyrinth passages used for filtering applications by passing the water there through. By the action of amphipods continually removing the thick build-up of biological layers on the physical surfaces of the filter matrix, a continually growing layer of biologically active, aerobic bacteria is maintained. By preventing the characteristic buildup of these layers, a more effective submerged biofilter can be constructed with additional biologically active surface area.

From observations, amphipods are known to inhabit reticulated foam biological filters in densities averaging 1,500 amphipods/liter reticulated foam filtering matrix. All life stages of amphipods are found throughout the foam. Fish are reported to be the principal predators of amphipods and the inoculation of small lakes with amphipods in small western lakes has, in a few instances, been reported to be temporarily successful in supplementing the natural food supply of trout. In demonstrations, fish have been observed to feed at the surface of inoculated foam but are unable to overgraze the amphipod protected by the small matrix interstices.

Thirty-five cubic feet of foam inoculated with amphipods was placed in a 2,000 gallon tank system stocked with 2,500 fish (*tilapia* specie). No other food was placed in the tank for a period of 8 weeks. At the end of this period, the fish demonstrated an average 5-fold gain in weight. Examination of the filtering matrix revealed a large colony of amphipods which had grazed the matrix surfaces and prevented the buildup of biofloc.

In a two year trial of a 6,000 gallon recirculating, closed-loop aquaculture system, a 70 cubic foot biological filter composed of reticulated foam remediated the water during the culture of Tilapia. This submerged filtering matrix handled the dissolved waste stream generated by 18,000 pounds of fish food consumed by the fish during this period without any maintenance. When the biofilter was dismantled at the end of the trial, the reticulated foam interstices were colonized by the amphipods and demonstrated almost no evidence of fouling.

To demonstrate the grazing of accumulated biofloc within a biofilter matrix, experimental microfilters were constructed and operated within a functioning aquaculture system with and without amphipods. The uninoculated filter quickly fouled within six weeks and had to be manually cleaned. The inoculated biofilters, in continuous operation for the last six months have remained functional and required no maintenance.

Recently, a recirculating fish culture system was used to demonstrate the filtering process using a culture of Tilapia. This system used vertical plate separators as a major biofilter component downstream of the gross solids removal zone. During previous operation, the plate separator had to be physically drained and pressure washed every four months to remove the accumulation of biofloc between the plates. With the introduction of amphipods into this component, the system has demonstrated the ability to bioremediate twice the amount of dissolved fish waste per day as that used previous to inoculation of amphipods, and has not required maintenance during the current 10 months of operation. A physical examination of the plates demonstrated amphipod activity and little build-up of biofloc on the plate surfaces. An additional observation recorded the activity of amphipods in the sediment layer located below the plates resulting in further bioremediation of this layer. With the use of an amphipod colony, no maintenance is required in the vertical plate separator component of this system.

Figure 3:
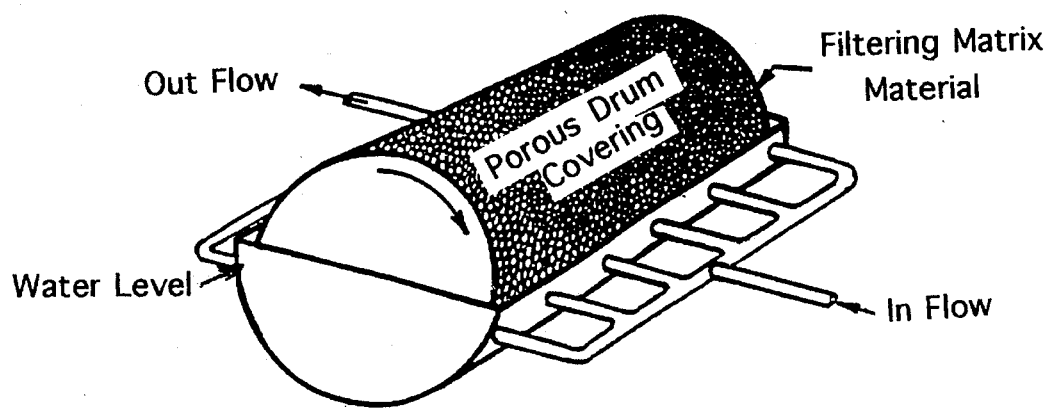
FIG. 3 shows a biodrum mechanical biofilter design used in aquaculture applications which incorporates an amphipod colony.

New technology developments in recirculating aquaculture production systems have demonstrated the potential benefits of injecting ozone into the water column. This process encourages flocculation and bioremediation of complex waste products. Amphipods can be cultured in an ozonated system and be maintained in a self-sustaining colony for over 8 months.

other types of mechanical biofilter apparatus designs used in aquaculture applications that can incorporate an amphipod colony is a biodrum design as shown in FIG. 3 which operates similar to a biodisk design as described above. The cylinder surface is porous with a reticulated filtering matrix material, and the drum is filled with some type of solid media having a high specific surface area per unit volume. A plastic bead or activated charcoal material of a size of roughly 4–12 mm in assorted size is used to allow the amphipods to traverse the media.

Figure 4:
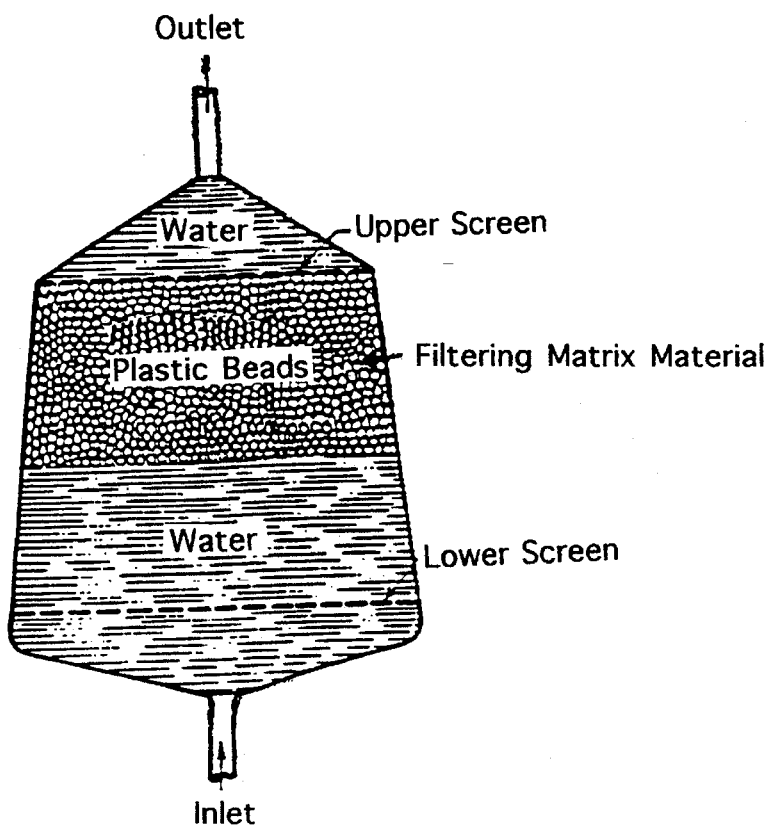
FIG. 4 shows a bead mechanical biofilter design used in aquaculture applications which incorporates an amphipod colony.

Another type of mechanical biofilter apparatus design used in aquaculture applications which can incorporate an amphipod colony is a bead filter as shown in FIG. 4 which is a specialized form of a fluidized bed. The beads in this type of filter are of rough irregular sizes and float whose sizes are of between 4–12 mm to allow the amphipod colony to traverse readily. The beads are held in the container by a screen at the outlet.

Figure 5:
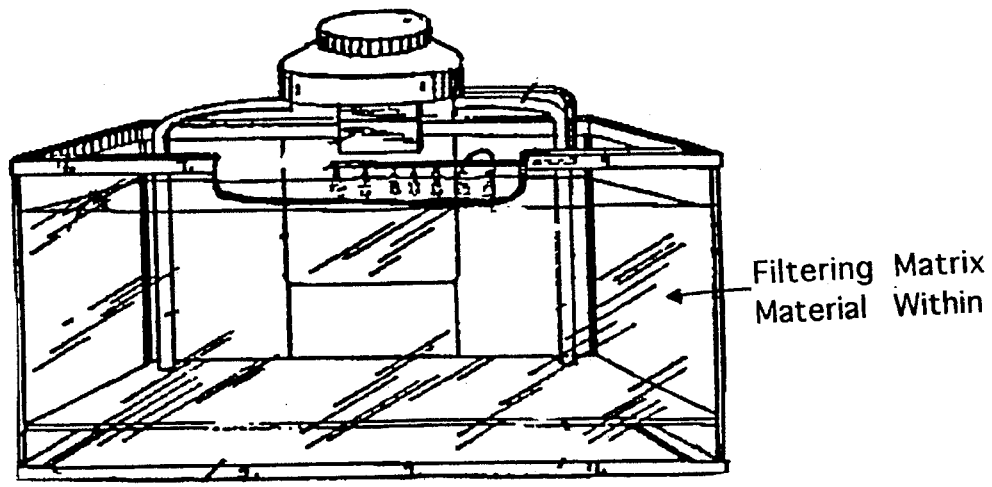
FIG. 5 shows a typical home aquarium aeration-filtration unit wherein its internal cavity contains a filtering matrix material in which amphipods form part thereof that provides maintenance-free operation of the filtering unit.

A typical filtration apparatus used in home aquaria that use mechanical filtering means is taught by U.S. Pat. No. 3,957,634 of Orensten et al. entitled "Filtration Means & Method," which is hereby incorporated by reference. Orensten et al. '634 patent shows actual filtering elements with very fine matrix type materials of 1–150 microns in size that assists in purification by removing unwanted materials from the aquarium system. Modifications of this reference to incorporate the advantages of the present invention would include using an amphipod colony with a filtering matrix material with pore size of approximately 4–12 mm so as to allow the amphipods to traverse the matrix material. Moreover, the matrix material can also be fiberglass, the well known material presently used in home aquaria. A typical home aquarium aeration-filtration unit is shown in FIG. 5 wherein its internal cavity contains a filtering matrix material which would include amphipods for maintenance-free operation.

Most of the above filtering systems can be supplied with an amphipod colony by inoculating their respective filtering systems by using a block of the filtering matrix material with an existing amphipod colony that can spread to other existing areas of the filter matrix material within the system. Reticulated foam with appropriate irregular openings for free migration is preferred.

OTHER EMBODIMENTS

This process can be incorporated into any aquatic process where organic sediments may accumulate and anaerobic bacterial populations are to be discouraged. These could include aquaculture, water gardens, waste lagoons, food processing, pretreatment, cooling towers, and tertiary sewage treatment. Amphipods feeding activities prevent the accumulation of anaerobic layers on the filtering matrix material. Feeding and movement of amphipods in sediment layers result in bioturbation which prevents the formulation of anaerobic conditions. Thus these natural activities minimize the occurrence of undesirable anaerobic flora.

Alternative location of the filtering matrix refuge is possible, however, the ideal location using existing filtering technology is downstream of gross solids removal.

Additionally, selection and development of a particular type of amphipod which have a greater range of culture environments as might be found in the culture of marine organisms can substitute for those now described herein.

Although the description above contains many specificities, these should not be construed as limiting the scope of this invention but as merely providing illustrations of some of the presently preferred embodiments of this invention.

We claim:

1. A method for maintenance-free treatment of flowing water in a managed aerobic water system for an aquiculture application of an aquatic specie, the method reduces undesirable biofloc materials from forming on surfaces of a means for filtering, the method comprising the steps of:

(a) inoculating the means for filtering with an amphipod colony;

(b) incorporating the means for filtering in a section of the water system and a means for protecting the amphipod colony from depredations by the aquatic specie;

(c) circulating the system's water through the means for filtering; and (d) maintaining aerobic conditions throughout the system wherein the amphipod colony remains self-sustaining and maintenance-free, whereby the amphipod colony's feeding activities prevent accumulations of anaerobic layers on the means for filtering which in turn minimizes: i) clogging of the filtering means and ii) undesirable anaerobic flora from occurring in the water system.

2. The method of claim 1 wherein the means for filtering is a filtering matrix material which similarly functions as the means for protecting the amphipod colony from depredations by the aquatic specie.

3. The method of claim 1 wherein the system's circulating water is maintained with: i) a dissolved oxygen content above approximately 2 parts per million and ii) a salinity that is between 0–32 parts per thousand.

4. The method of claim 1 wherein the amphipod colony is of a type *Hyallela azteca*.

5. The method of claim 2 wherein the filtering matrix material is reticulated foam whose individual porous openings vary between 4–12 mm in size.

6. The method of claim 2 wherein the filtering matrix material is activated charcoal whose individual porous openings vary between 4–12 mm in size.

7. The method of claim 2 wherein the filtering matrix material is plastic beads whose individual porous openings vary between 4–12 mm in size.

8. The method of claim 1 wherein the filtering means is a trickling tower biofilter device.

9. The method of claim 1 wherein the means for filtering is a biodisk biofilter device.

10. The method of claim 1 wherein the means for filtering is a biodrum biofilter device.

11. The method of claim 1 wherein the means for filtering is a bead biofilter device.

12. The method of claim 1 wherein the means for filtering is a filtering matrix material consisting of tube settlers.

13. The method of claim 1 wherein the means for filtering is a submerged filtering device.

14. The method of claim 13 wherein the submerged filtering device is an upflow filtering device with multiple parallel, separated plate units.

15. The method of claim 13 wherein the submerged filtering device is a downflow filtering device with multiple parallel, separated plate units.

16. The method of claim 13 wherein the submerged filtering device is a downflow filtering device with multiple parallel, separated plate units with tube settlers incorporated into the device.

17. The method of claim 13 wherein the submerged filtering device is an upflow filtering device with multiple parallel, separated plate units with tube settlers incorporated into the device.

* * * * *